US009230392B2

(12) United States Patent
Baseley et al.

(10) Patent No.: US 9,230,392 B2
(45) Date of Patent: Jan. 5, 2016

(54) GAMING MACHINE

(75) Inventors: Kevin Gordon Baseley, Coogee (AU);
Peter Alexander Von Konigsmark, Lane Cove (AU)

(73) Assignee: Aristocrat Technologies Australia Pty Limited (AU)

( * ) Notice: Subject to any disclaimer, the term of this patent is extended or adjusted under 35 U.S.C. 154(b) by 1559 days.

(21) Appl. No.: 11/779,581

(22) Filed: Jul. 18, 2007

(65) Prior Publication Data

US 2008/0132318 A1 Jun. 5, 2008

(30) Foreign Application Priority Data

Jul. 19, 2006 (AU) ................................ 2006903885

(51) Int. Cl.
*G07F 17/32* (2006.01)
*G06F 21/12* (2013.01)
*H05K 1/14* (2006.01)

(52) U.S. Cl.
CPC .............. *G07F 17/32* (2013.01); *G06F 21/123* (2013.01); *G07F 17/3241* (2013.01); *H05K 1/141* (2013.01)

(58) Field of Classification Search
CPC ........................... G07F 17/3241; G06F 21/123
USPC ............................................... 463/29, 40, 42
See application file for complete search history.

(56) References Cited

U.S. PATENT DOCUMENTS

| | | | | |
|---|---|---|---|---|
| 6,149,522 A * | 11/2000 | Alcorn et al. | .................... | 463/29 |
| 6,595,856 B1 * | 7/2003 | Ginsburg et al. | ............... | 463/29 |
| 6,620,047 B1 * | 9/2003 | Alcorn et al. | .................... | 463/37 |
| RE39,368 E * | 10/2006 | Alcorn et al. | .................... | 463/29 |
| 7,367,889 B2 * | 5/2008 | Canterbury | ..................... | 463/43 |
| 7,406,602 B2 * | 7/2008 | Gauselmann | ................. | 713/187 |
| 7,520,811 B2 * | 4/2009 | LeMay et al. | .................... | 463/29 |
| 2003/0014639 A1 * | 1/2003 | Jackson et al. | ............... | 713/181 |
| 2003/0216172 A1 * | 11/2003 | LeMay et al. | .................... | 463/29 |
| 2004/0002381 A1 * | 1/2004 | Alcorn et al. | .................... | 463/37 |
| 2004/0048660 A1 * | 3/2004 | Gentles et al. | ................. | 463/29 |
| 2004/0266533 A1 * | 12/2004 | Gentles et al. | ................. | 463/42 |
| 2005/0143171 A1 * | 6/2005 | Loose | ............................ | 463/29 |
| 2006/0068913 A1 | 3/2006 | Walker et al. | | |
| 2006/0100010 A1 | 5/2006 | Gatto et al. | | |

FOREIGN PATENT DOCUMENTS

| | | |
|---|---|---|
| EP | 1352677 A2 | 10/2003 |
| EP | 1435557 A2 | 7/2004 |
| WO | WO 94/06071 | 3/1994 |

OTHER PUBLICATIONS

European Search Report corresponding to European Application No. 07112617.1, dated Feb. 6, 2008, 7 pages.

* cited by examiner

*Primary Examiner* — Jay Liddle
(74) *Attorney, Agent, or Firm* — McAndrews, Held & Malloy, Ltd.

(57) ABSTRACT

A gaming machine comprising, a main circuit comprising a main processor and a main memory, the main memory storing program code that allows a player of the gaming machine to play the at least one game when executed by the main processor, the program code including authentication code that, when executed, causes the main processor to output challenge data and modify game play if valid response data is not received, and an auxiliary circuit in data communication with the main processor and comprising an auxiliary processor configured to process challenge data received from the main processor in order to output valid response data to the main processor.

8 Claims, 6 Drawing Sheets

GAMING MACHINE

CROSS REFERENCE TO RELATED APPLICATIONS

This application claims priority to Australian Patent Application No. AU2006903885, having an international filing date of Jul. 19, 2006, entitled "A Gaming Machine", which is hereby incorporated by reference herein in its entirety.

FIELD OF THE INVENTION

The present invention relates to a gaming machine having an auxiliary circuit, a method of upgrading a gaming machine and a gaming method.

BACKGROUND TO THE INVENTION

In the gaming industry a significant amount of capital is invested in gaming machines. That is, there is a significant capital outlay in producing machines and in their subsequent purchase by gaming venue operators.

There is a need for techniques for improving existing gaming machines. It is preferable, that such techniques can also be applied to new gaming machines.

SUMMARY OF THE INVENTION

In a first aspect the invention relates broadly to a gaming machine comprising:

a main circuit comprising a main processor and a main memory, the main memory storing program code that allows a player of the gaming machine to play the at least one game when executed by the main processor, the program code including authentication code that, when executed, causes the main processor to output challenge data and modify game play if valid response data is not received; and an auxiliary circuit in data communication with the main processor and comprising an auxiliary processor configured to process challenge data received from the main processor in order to output valid response data to the main processor.

Thus, if the auxiliary circuit is not present or valid response data is not generated, game play will be modified.

Depending on the embodiment, game play may be modified by being stopped or by disabling some aspects of the game, for example, the functions to enter credits or collect credits.

In an embodiment, the authentication code causes the main processor to repeatedly output challenge data. For example, periodically, at random intervals, or in response to execution of specific program code.

In an embodiment, the main circuit is provided by a main circuit board and the auxiliary circuit is provided on an auxiliary circuit board.

In an embodiment, the main circuit is in data communication with the auxiliary circuit via an address bus.

In an embodiment, the auxiliary circuit board comprises an additional function circuit and an address decoder for activating the auxiliary circuit or the additional function circuit in dependence on address data received via the address bus from the main processor.

The first aspect of the invention also broadly relates to an auxiliary circuit configured to be placed in data communication with a main circuit of a gaming machine which comprises a main processor, the auxiliary circuit comprising an auxiliary processor configured to process challenge data received from the main processor in order to output valid response data to the main processor when in use.

The first aspect of the invention also relates broadly to a method of upgrading a gaming machine to enhance security comprising:

storing authentication code in a memory of a main circuit of a gaming machine that, when executed by a main processor of the main circuit causes the main circuit to output challenge data and modify game play if valid response data is not received; and placing an auxiliary circuit in data communication with the main circuit of a gaming machine, the auxiliary circuit configured to process challenge data received from the main processor in order to output valid response data to the main processor.

The first aspect of the invention also relates to a game method comprising:

implementing a game with a gaming machine comprising a main processor;

sending challenge data to an auxiliary circuit configured to process the challenge data in order to output valid response data to the main processor; and modifying game play of the game if valid response data is not received by the main processor.

In a second aspect the invention relates broadly to a gaming machine comprising:

a main circuit comprising a main processor and a main memory, the main memory storing program code that allows a player of the gaming machine to play at least one game when executed by the main processor, the program code including sub-routine code that, when executed, causes the main processor to output sub-routine data; and an auxiliary circuit in data communication with the main processor and comprising an auxiliary processor and an auxiliary memory storing auxiliary program code, the auxiliary processor configured to process at least part of the auxiliary game code in response to receipt of the sub-routine data in order to provide sub-routine outcome data to the main processor.

In an embodiment, the sub-routine data comprises a sub-routine command.

The second aspect of the invention also broadly relates to an auxiliary circuit configured to be placed in data communication with a main circuit of a gaming machine that comprises a main processor, the auxiliary circuit comprising an auxiliary processor and an auxiliary memory storing auxiliary game code, the auxiliary processor configured to process at least part of the auxiliary game code in response to receipt of sub-routine data from the main processor in order to provide sub-routine outcome data to the main processor when in use.

The second aspect of the invention also relates broadly to a method of upgrading a gaming machine comprising:

storing sub-routine code in a main memory of a main circuit that, when executed by a main processor of the main circuit causes the main processor to output sub-routine data; and placing an auxiliary circuit in data communication with the main circuit, the auxiliary circuit comprising an auxiliary processor and an auxiliary memory storing auxiliary game code, the auxiliary processor configured to process at least part of the auxiliary game code in response to receipt of the sub-routine data in order to provide sub-routine outcome data to the main processor.

The second aspect of the invention also relates broadly to a game method comprising:

executing program code that allows a player of the gaming machine to play at least one game, with a main processor of a main circuit, the program code including sub-routine code that, when executed, causes the main processor to output sub-routine data; and executing auxiliary program code with an auxiliary processor of an auxiliary circuit in data communication with the main processor in response to receipt of the sub-routine data in order to provide sub-routine outcome data to the main processor.

In an embodiment, the two aspects of the invention are combined.

BRIEF DESCRIPTION OF THE DRAWINGS

Notwithstanding any other embodiments that may fall within the scope of the present invention, certain embodiments of the present invention will now be described, by way of example only, with reference to the accompanying figures, in which.

DETAILED DESCRIPTION OF CERTAIN EMBODIMENTS

Figure 1:
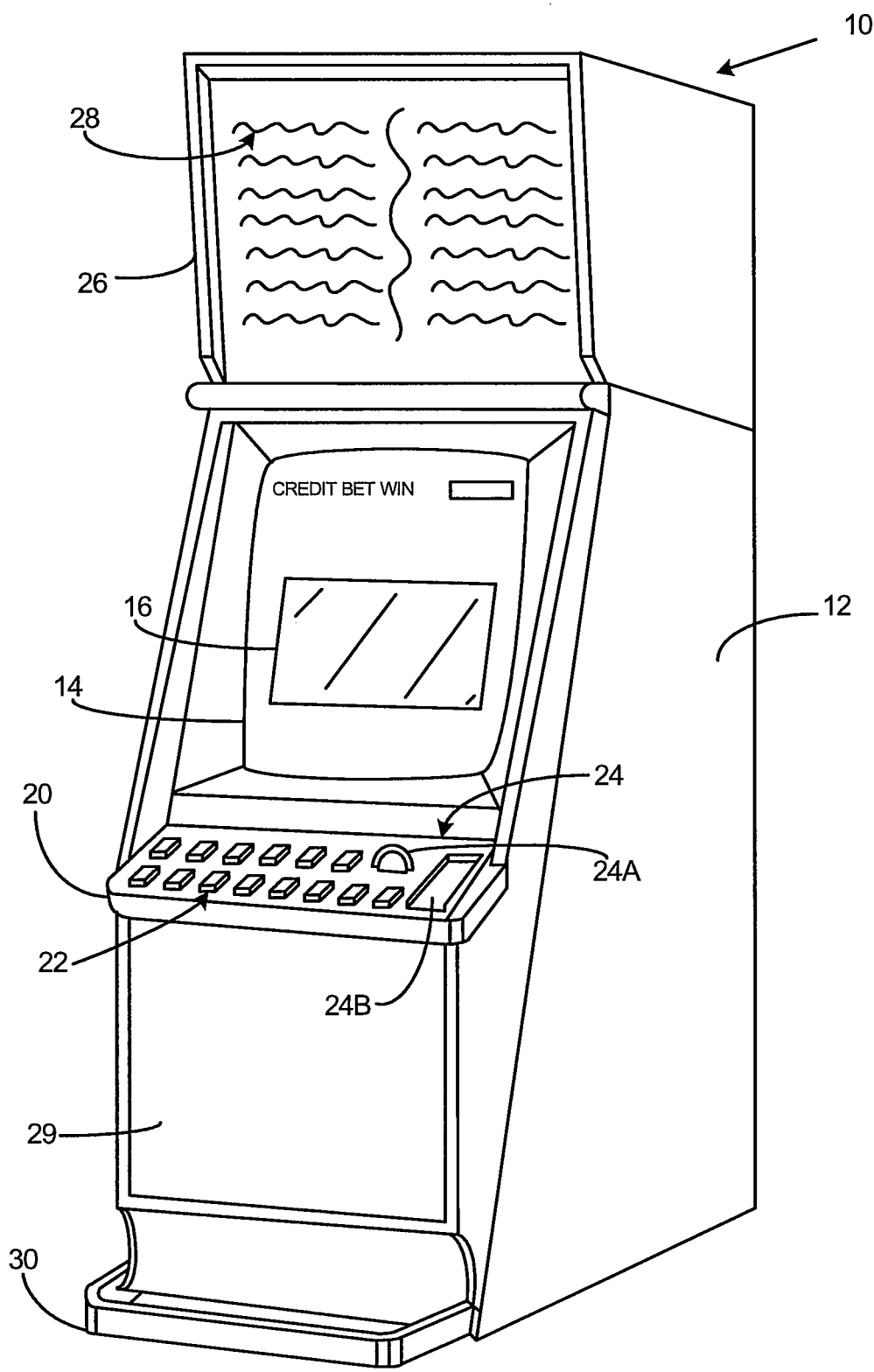
FIG. 1 is an isometric view of a gaming machine.

Referring to the drawings, there is shown a gaming machine that has an auxiliary circuit. The auxiliary circuit is used to provide security functionality and/or additional processing functionality. The auxiliary circuit can be provided as part of a gaming machine or added to an existing gaming machine to upgrade that machine.

A gaming machine 10 is illustrated in FIG. 1. The gaming machine 10 has a number of components which enable a player to interact with the gaming machine (e.g. to input game instructions, input/output credits, and watch the game), these are referred to collectively as a "player interface" and the components will become apparent from the following description. The gaming machine 10 includes a console 12 having a display 14 on which is displayed representations of a game 16 that can be played by a player. A mid-trim 20 of the gaming machine 10 houses a bank of buttons 22 for enabling a player to interact with the gaming machine, in particular during gameplay. The mid-trim 20 also houses a credit input mechanism 24 which in this example includes a coin input chute 24A and a bill collector 24B. Other credit input mechanisms may also be employed, for example, a card reader for reading a smart card, debit card or credit card. A reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 1 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 2:
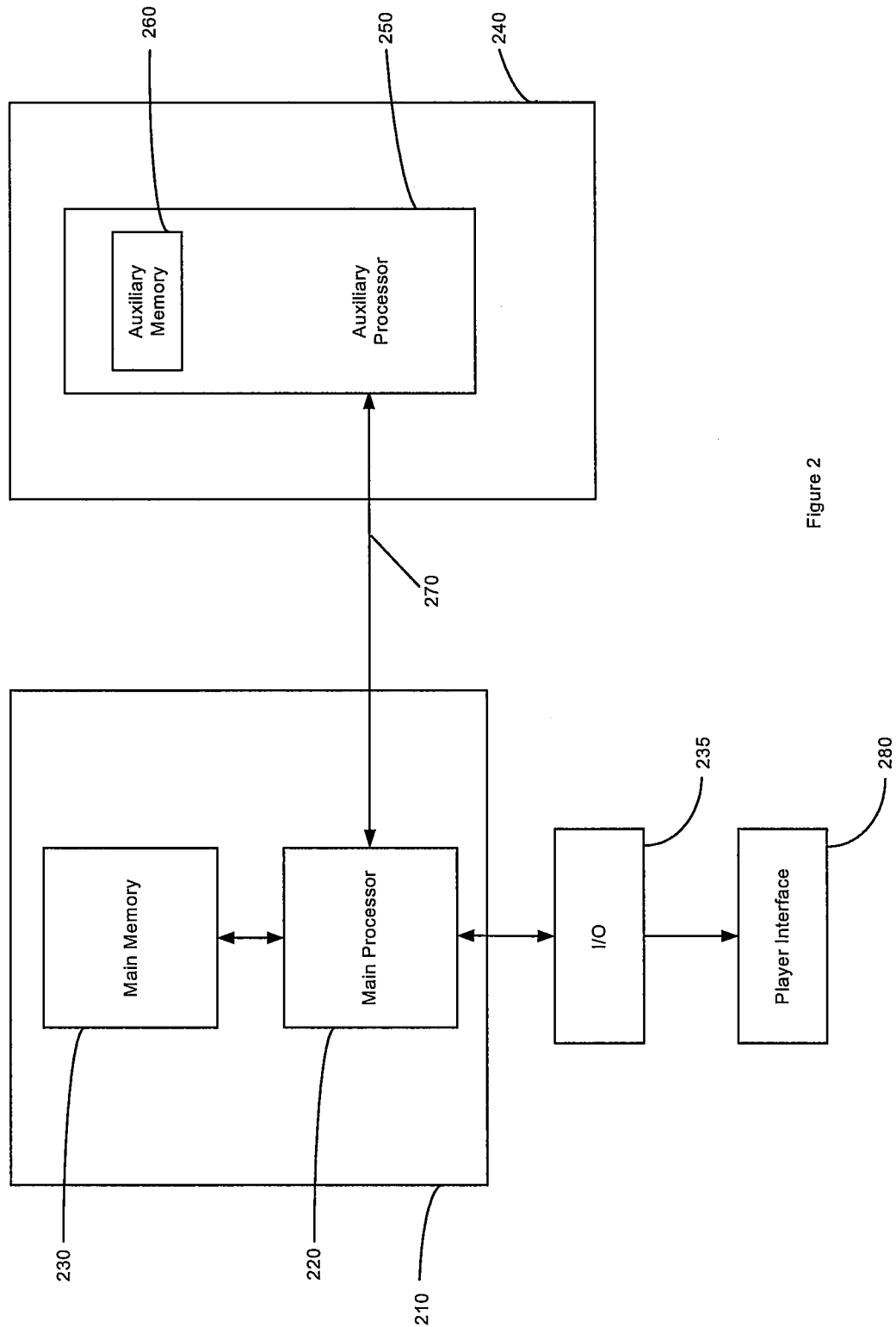
FIG. 2 is a block diagram of a gaming machine.

FIG. 2 is a block diagram illustrating the main components of a gaming machine in accordance with an embodiment. Other components known to persons skilled in the art such as hardware meters are not illustrated for clarity of exposition. The gaming machine has a main circuit in the form of a main circuit board 210 having a main processor 220 and a main memory 230. Herein the term "processor" is used to refer generically to any device that can process instructions and may include: a microprocessor, microcontroller, programmable logic device or other computational device.

The main memory 230 stores the program code for at least one game to be played by a player on the gaming machine. In an embodiment, the main memory 230 is an Erasable Programmable Read-Only Memory (EPROM) and can be exchanged with another EPROM containing a different game in order to change the game that can be played by the gaming machine. Providing the game program code on an EPROM in order to allow interchangeability of the game, results in a security risk as EPROMS can be copied using a relatively low cost and accessible programmer. Such a programmer can be used to read out the data and write it onto a blank EPROM. This is of concern as the games represent significant intellectual property. A further result of this modular design, is that the EPROMs that are compatible with the main circuit board 210 have a fixed capacity and accordingly can only store a certain amount of program code. This affects the type of games that can be delivered with such machines.

An embodiment provides an auxiliary circuit board 240 having an auxiliary processor 250 including an auxiliary memory 260. The auxiliary circuit board 240 is provided on a printed circuit board that occupies a slot in the electronic machine's logic cage. In an embodiment the slot is one commonly used for the Liquor Administration Board (LAB) communication functions. As described in further detail below, the auxiliary circuit 240 also implements the LAB communications hardware as an additional function.

It will be noted that the gaming machine 10 includes a number of other components, notably a player interface 280 connected to the main processor by an input/output interface 235. As described above, the player interface is the display and other input/output mechanisms that enable the player to play and view the game.

The security function provided by the auxiliary circuit employs a challenge-response authentication method. The game program code stored in main memory 230 is either modified or configured from the outset to include authentication code, which when executed by the main processor 220, causes the main processor to output challenge data to the auxiliary processor 250 on address bus 270. The auxiliary processor 250 is intended to process the challenge data sent to it by the main processor 220 to produce valid response data. If the auxiliary processor 250 produces invalid response data or a response is not received from the auxiliary processor 250 within a predetermined time frame, the main processor 220 initiates a lock up event, preventing further game play. In an embodiment, the main processor outputs challenge data periodically in order to periodically check for the presence of the auxiliary circuit board 240. This prevents the auxiliary circuit board 240 from being removed after the game has been started up and transferred to another gaming machine.

In an embodiment, the auxiliary processor 250 is provided in the form of a microcontroller. The auxiliary memory 260 is an internal memory of the auxiliary processor 250. The firmware or program code for the auxiliary processor 250 is stored within the auxiliary processor 250 itself. This allows the auxiliary processor 250 to be locked during production so that the firmware cannot be read back out. This prevents third parties from copying games, as while they may be able copy the main memory 230, the game will not run if an authentic auxiliary circuit board 240 is not attached.

The auxiliary circuit board 240 also contains all the electronics required for implementing the LAB communications functions. It will be appreciated that the auxiliary circuit board 240 could be provided on an addition circuit having a different additional function, not just the LAB communications function.

Figure 3:
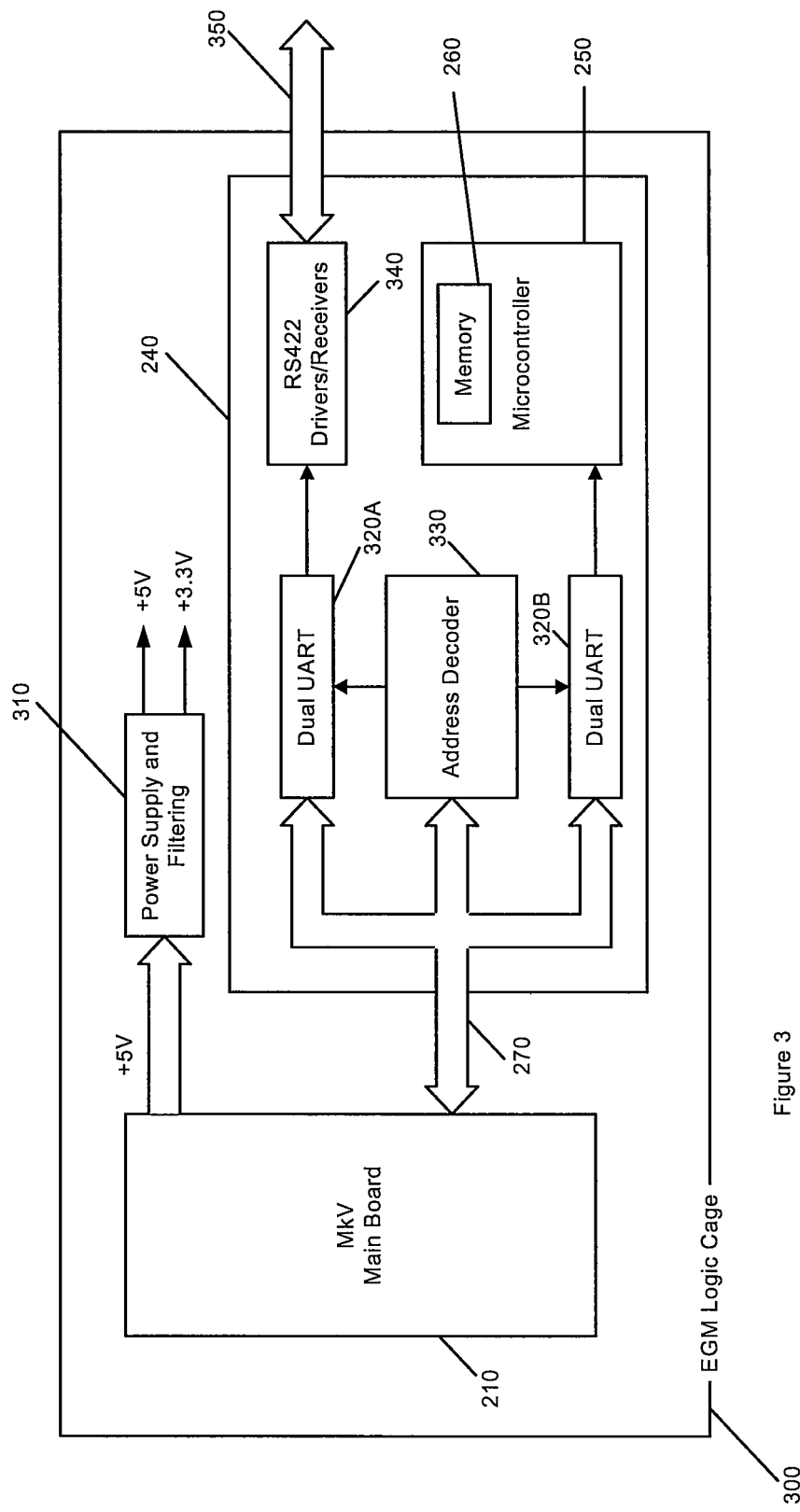
FIG. 3 is a block diagram of a gaming machine with an auxiliary circuit.

FIG. 3 shows a block diagram of the auxiliary circuit and its interconnectivity with the main board. As can be seen from FIG. 3, the LAB circuitry 340 is partitioned quite separately from the auxiliary circuitry 250. This allows appropriate modularisation of game code on the main board, as the LAB communications module does not need to interact with the microcontroller 250, and the microcontroller 250 does not need to interact with the LAB communications hardware.

Address decoding is used to generate the Chip Select (CS) lines of devices sitting on a bus during a processor read or write cycle. In the case of the auxiliary circuit board 240, two Dual Universal Asynchronous Receive/Transmit (DUART) devices 320A, 320B reside in the main processor's address space. To communicate with these devices, the main processor 220 issues a read or write command to a particular address in the address space. The address is analysed and if it matches the address of one of the DUARTs 320A, 320B, the address decoder asserts the CS line for the particular device 340,350. This allows the device 340,350 to connect to the bus and respond to the processor's commands. Note DUART 230B could be replaced with a single UART.

The DUART is used to provide a serial port for the main board to interface to the microcontroller is the 16C452, for example. This device is a standard DUART so its operation will not be discussed in detail.

A Glue Address Logic (GAL) device is used to implement the address decoder 330 on the auxiliary circuit. The particular device selected is the GAL20V8, for example.

In addition to address decoding, the GAL 336 is responsible for passing on Interrupt (INT) requests from the DUARTs 320 to the processor 220. The INTA and INTB lines of each DUART 320A, 320B are logically ORed together to form a single interrupt out line, which is connected to the interrupt line on the bus. When either UART module asserts its INT line, the main processor 220 will be interrupted, and as a result the game code on the main board will poll each DUART checking to see if it requires servicing.

The microcontroller selected to provide the auxiliary processor for this embodiment is the ATmega8; one of the AVR family of microcontrollers by Atmel, for example. The microcontroller has the following features:
8 bit RISC processor
Up to 16MIPS® 16 MHz
8 KB Flash
1 KB SRAM
512B EEPROM
Two 8 bit Timer/Counter modules
One 16 bit Timer/Counter module
8 channel 10 bit successive approximation Analog—Digital Converter
UART module The microcontroller is clocked using a 7.3728 MHz crystal, which was determined to be sufficiently fast to do the required reception, processing and re-transmission of packets within the time frame allowed by the Dongle module in the game code, for example.

A standard AVR In System Programming (ISP) 10 pin box header is provided for programming the microcontroller during production and debug, for example.

The AVR family of microcontrollers all provide firmware protection features by the setting of a lockbit during programming. Setting the lockbits ensures that the memory of the device cannot be read out.

In order to implement authentication within the game code running on the main board 210, a program thread is created on start-up by an authentication function. This provides an effective barrier to tampering of the game as even if the EPROM is copied of the main processor 220, a valid auxiliary circuit board 240 is required in order to run the game.

Figure 4:
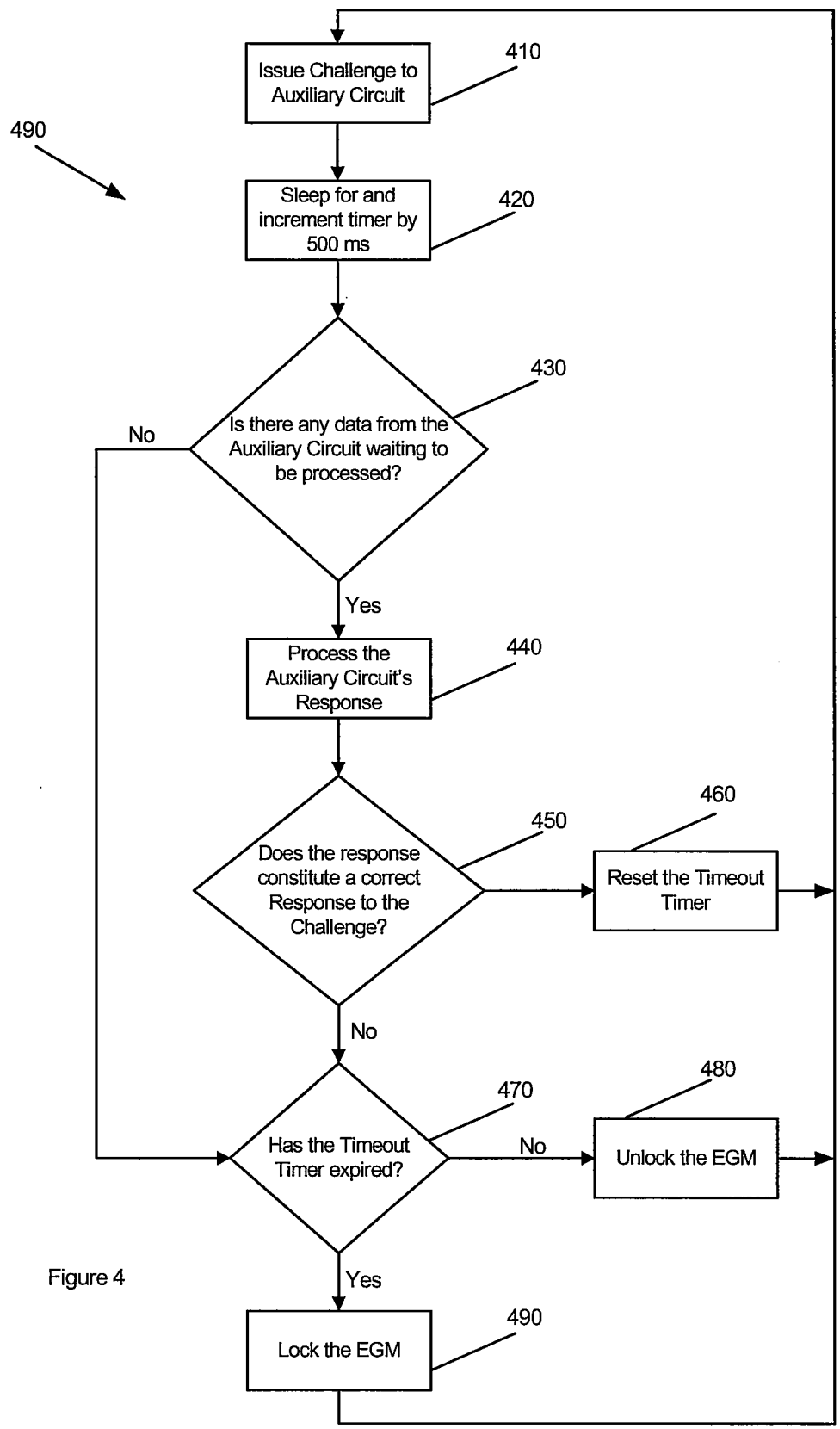
FIG. 4 is a challenge response flow chart.

The security authentication function is illustrated in the flowchart of FIG. 4. The processor issues a challenge 410 to the auxiliary circuit board. The processor increments time by 500 milliseconds 420 in order to allow time for a response to be received from the auxiliary circuit board.

The main processor 220 then determines 430 whether any data has been received from the auxiliary circuit board 240 that is waiting to be processed. If the answer is no, the processor 220 proceeds to determine 470 whether the time out timer has expired. If the answer is yes, the main processor 220 processes 440 the response from the auxiliary circuit board 240. The main processor 220 then determines 450 whether the response is a valid response to the challenge. If it is a valid response, the main processor resets 460 the time out timer and starts the process again by issuing 410 a further challenge to the auxiliary circuit 410. If the response is invalid, the main processor determines 470 whether the time out timer has expired. If it has not, the gaming machine is unlocked 480 and a further challenge is issued 410. If the time out has expired, the main processor locks 490 the gaming machine.

When the main processor 220 has determined that the auxiliary circuit has not responded correctly to a Challenge within the required period of time, it triggers a lockup event using the standard Fault module channels. It will not retrigger the auxiliary circuit lockup unless it has been cleared by the Fault module.

To clear the auxiliary circuit lockup, the Reset/Jackpot key must be turned. This will cause the Fault module to clear all faults in the EGM, and re poll for fault states.

While it is preferred that the gaming machine be locked up so that game play is stopped, other modifications of game play such as making functions unavailable (e.g. credit input/output) would also equally disable the game.

The data packet of authentication data that is transferred to and from the auxiliary circuit board 240 is wrapped up with several layers of encapsulation.

The structure of the inner packet is shown in Table 1:

TABLE 1

| Byte 1 | Byte 2 | Bytes 3 ... n | Byte n + 1 | Byte n + 2 |
|---|---|---|---|---|
| Command | Packet Length (n) | Data Block | CRC | |

Packet length is defined to be the length of the length of the inner packet except the CRC bytes.

Valid command bytes are shown in Table 2:

TABLE 2

| Command | Byte |
| --- | --- |
| DONGLE_ACK | 0x2C |
| DONGLE_MICRO_PROG_NUM | 0x2D |
| DONGLE_DEBUG_MESSAGE | 0x2F |
| DONGLE_PING | 0x31 |
| DONGLE_PROG_NUM_REQ | 0x34 |

DONGLE_PING:
This packet contains the Challenge byte from the game program code.
DONGLE_ACK:
This packet is the auxiliary circuit board's Response to the Challenge byte it has been sent. The payload contains the Response byte.
DONGLE_PROG_NUM_REQ:
This packet is sent when the game software wants the auxiliary circuit board to report its program number. The packet length is 2 and there is no data payload.
DONGLE_MICRO_PROG_NUM:
This packet is the response that is issued to the game software's request for the auxiliary circuit board firmware program number. The packet length is 13 (depending on the length of the program number string), and the data payload is the program number string.
DONGLE_DEBUG_MESSAGE:
This command is included so that debug messages can be sent from the Dongle to the game software for re-transmission to the gaming machine's debug terminal.

As indicated above, the inner packets include two Cyclic Redundancy Check (CRC) bytes to detect errors introduced during transmission. A CRC is computed and appended before transmission, and verified afterwards by the recipient to confirm that no changes occurred on transit.

The CRC used is standard 16 bit CCITT polynomial (0x1021), where the generator polynomial is defined to be $$G(x)=x^{15}+x^{12}+x^{5}+1$$

with an initial value of 0xFFFF

This polynomial results in an error detection rate of approximately 99.998%, so is able to detect a single bit error in a packet of over 8000 bytes.

Figure 5:
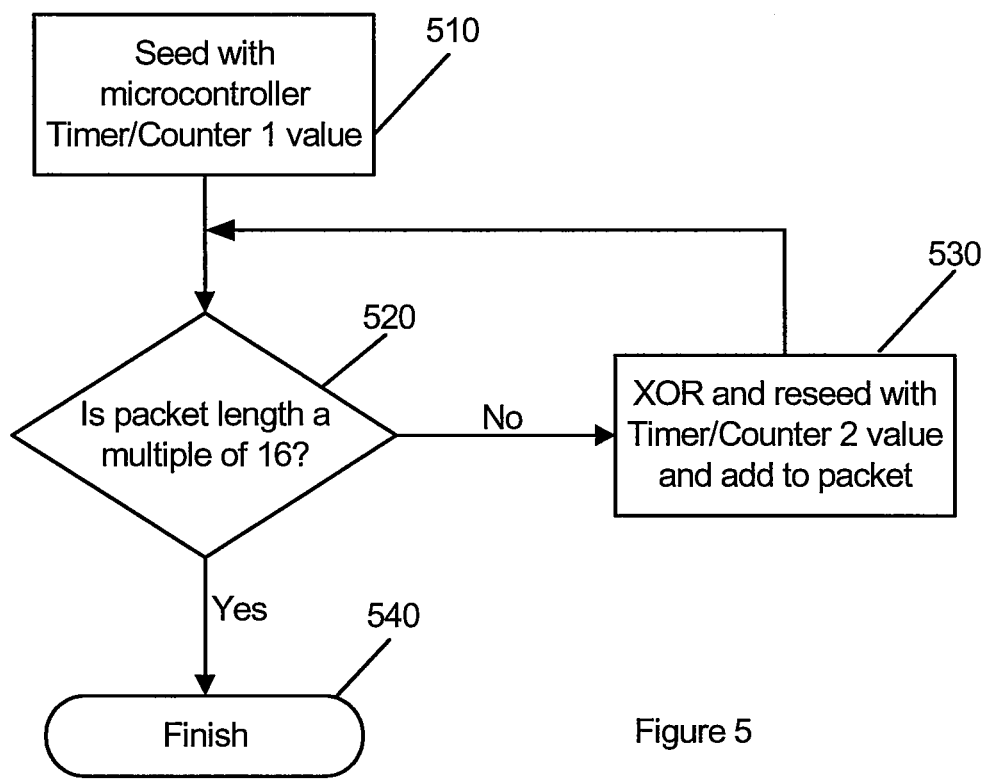
FIG. 5 is a flow chart of a packet stuffing algorithm.
Figure 6:
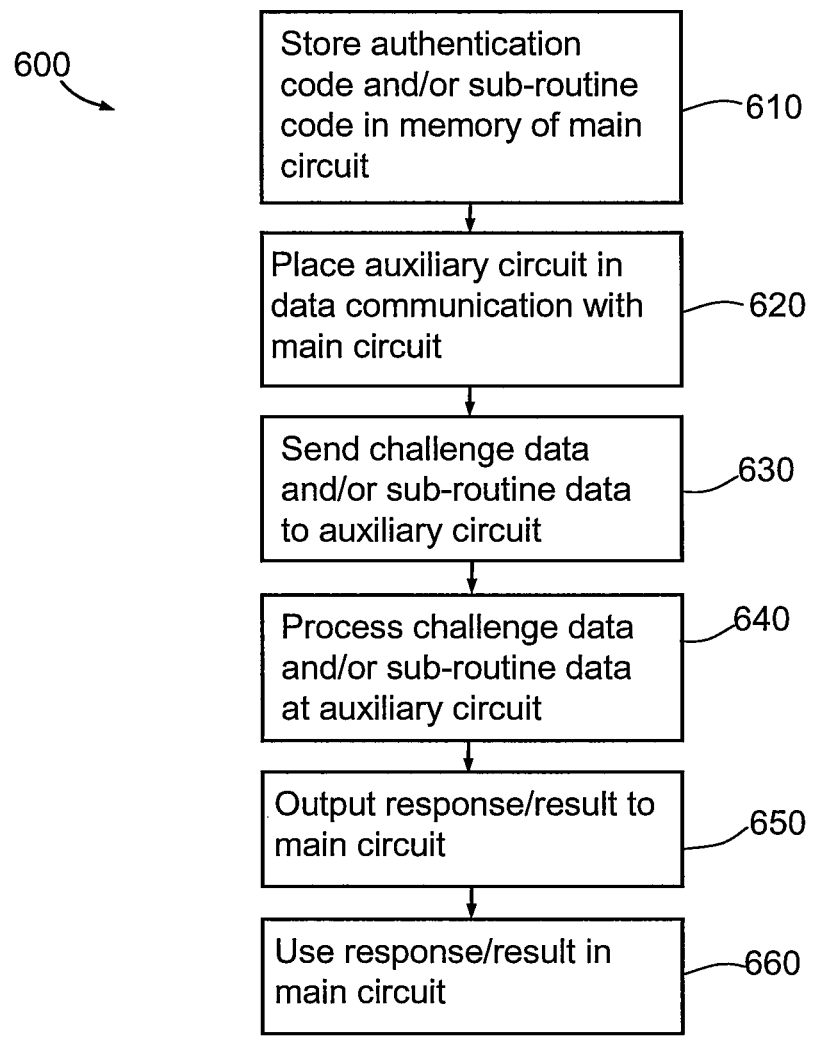
FIG. 6 is a flow chart of an auxiliary processing method.

Inner packets are stuffed with random data so that their length is a multiple of 16 bytes. This is to facilitate encryption, which is detailed below. The statistical distribution of the random data is not particularly important, as it is only used for expanding the packet out to a 16 byte block boundary. The packet stuffing algorithm is illustrated in FIG. 5. The process begins by seeding the packet with the microcontroller timer/counter 1 value. At step 520, it is determined whether the packet length is a multiple of 16, if it is not the value is XORed and reseeded with the timer/counter 2 value and added to the packet at step 530 again. The packet length is repeatedly checked at step 520 until the process finishes 540.

The stuffed packet is then encrypted using the Advanced Encryption Standard (AES), which is a block cipher.

After the stuffed packet of N bytes has been encrypted by AES into a packet of N bytes, the encrypted packet is encapsulated for the final time before transmission. This process adds a start byte for receiver synchronization and a packet length for receiver processing and memory allocation, where the packet length is defined to be the length of the Encrypted Data block only.

In an embodiment, the correct response to verify authentication is the 1's complement of the challenge data byte. The 1's complement is defined to be:

$$\overline{N}=(2^{n}-1)-N$$

where: n is the number of bits per word (in this case 8); N is a positive integer; $\overline{N}$ is the 1's complement of N.

An alternative way to compute the 1's complement is to take the bit by bit complement of the binary number.

For example:
$18_{10}=00010010_{2}$ $11101101_{2}=237_{10}$
1's complement $221_{10}=11011101_{2}$ ⇒ $00100010_{2}=34_{10}$
1's complement $194_{10}=11000010_{2}$ ⇒ $00111101_{2}=61_{10}$
1's complement Referring again to FIG. 2, the auxiliary circuit board 240 can be used to implement other functionality and in particular auxiliary game processing. While preferably provided in addition to the security authentication function described above, the additional processing function can be provided independently in some embodiments.

In one such embodiment, the program code stored in the main memory 230 includes sub-routine code which makes a call to the auxiliary processor for a particular function to be implemented, for example processing of particular pay tables stored as auxiliary game code in the auxiliary memory 260. The sub-routine data sent to the auxiliary processor from the main processor 225 address bus 270 is typically a specific command that causes the auxiliary processor 250 to process a relevant portion of the program code stored in the auxiliary memory 260 in order to produce sub-routine outcome data that is then output to the main processor. This allows games that would not fit within the main memory 230 to be processed on the gaming machine. Where the additional processing is performed in addition to the authentication, this is referred to as an additional function and the auxiliary circuit can be understood as providing an additional function circuit. In an alternative embodiment, the additional function circuit could be a separate circuit, accessed using address decoding.

It will be appreciated from the above discussion that the auxiliary circuit board 240 can be used to upgrade an existing gaming machine in order to provide a security function and/or additional game processing function using the techniques described above. In order to upgrade a game, the main memory of the main circuit board 210 is typically replaced with a new main memory compatible with the mother circuit board containing updated game code which contains authentication code and/or sub-routine code depending on whether the gaming machine is being upgraded to incorporate an authentication function and/or an additional processing function. The auxiliary circuit board 240 is then connected to the address bus 270 of the gaming machine 10. As described above, this is preferably achieved by providing the auxiliary circuit board in a form that includes the functionality of an existing function performed by an existing circuit board. In the example given above, this is the LAB functionality.

Accordingly certain embodiments of the invention provide an upgrade and auxiliary processing method 600. The upgrade is achieved by storing authentication code and/or sub-routine code in the memory of a main circuit 610 and placing an auxiliary circuit intended to interact with the authentication code or sub-routine code in data communication with the main circuit 620. Thereafter, challenge data and/or sub-routine data can be sent from the main circuit to the auxiliary circuit 630. The auxiliary circuit processes the challenge data and/or sub-routine data 640. The auxiliary circuit outputs a response/result to the main circuit 650 which uses 660 the response/result.

Persons skilled in the art will appreciate that various modifications and variations on the above embodiments fall within the scope of the invention described herein.

The invention claimed is:

1. A gaming machine comprising:
   an address bus;
   a main circuit coupled to said address bus, said main circuit comprising a main processor and a main memory, the main memory storing program code that allows a player of the gaming machine to play at least one game when executed by the main processor, the program code including authentication code that, when executed, causes the main processor to output challenge data and modify game play if valid response data is not received, and sub-routine code that, when executed, outputs sub-routine data; and
   an activatable auxiliary circuit removably attachable to said main circuit via said address bus, said activatable auxiliary circuit upon attachment and activation being in data communication with the main circuit via said address bus, and said activatable auxiliary circuit comprising an auxiliary processor configured to receive said challenge data from the main processor and to process said challenge data in order to output the valid response data to the main processor;
   an activatable additional function circuit partitioned separately from the activatable auxiliary circuit and the main circuit, said activatable additional function circuit upon activation being in data communication with the main circuit via the address bus, and said activatable additional function circuit, when activated, is responsive to receipt of the sub-routine data from the main processor to produce sub-routine outcome data; and
   an address decoder partitioned separately from the main circuit, the activatable auxiliary circuit and the activatable additional function circuit, the address decoder being in data communication with the main circuit, the activatable auxiliary circuit and the activatable additional function circuit via the address bus, and the address decoder being configured to receive address data from the main processor via the address bus and to activate the activatable auxiliary circuit when the activatable auxiliary circuit is attached to said main circuit, the activatable additional function circuit, or both the activatable auxiliary circuit when the activatable auxiliary circuit is attached to said main circuit and the activatable additional function circuit in dependence on the address data received via the address bus from the main processor.

2. A gaming machine as claimed in claim 1 wherein the main processor is arranged to modify game play by stopping game play.

3. A gaming machine as claimed in claim 1 wherein the main processor is arranged to modify game play by disabling at least one function.

4. A gaming machine as claimed in claim 1 wherein the authentication code is arranged to cause the main processor to repeatedly output challenge data such that there are repeated challenge response cycles.

5. A gaming machine as claimed in claim 1 wherein the main circuit is provided by a main circuit board and the activatable auxiliary circuit, the activatable additional function circuit and the address decoder are provided on an auxiliary circuit board.

6. An activatable auxiliary circuit board being removably attachable to a main circuit of a gaming machine, and in response to said auxiliary circuit board having been attached to said main circuit and having been activated, being configured to be placed in data communication with said main circuit via an address bus and to receive challenge data from the main circuit, the main circuit comprising a main processor and a main memory having sub-routine code that when executed outputs sub-routine data, the auxiliary circuit board comprising:
   an activatable auxiliary circuit comprising an auxiliary processor configured to process said challenge data from the main processor in order to output valid response data to the main processor when in use;
   an activatable additional function circuit partitioned separately from the activatable auxiliary circuit and the main circuit, said activatable additional function circuit upon activation being in data communication with the main circuit via the address bus, and said activatable additional function circuit, when activated, is responsive to receipt of the sub-routine data from the main processor to produce sub-routine outcome data; and
   an address decoder partitioned separately from the main circuit, the activatable auxiliary circuit and the activatable additional function circuit, the address decoder being in data communication with the main circuit, the activatable auxiliary circuit and the activatable additional function circuit via the address bus, and the address decoder being configured to receive address data from the main processor via the address bus and to activate the activatable auxiliary circuit when the activatable auxiliary circuit is attached to said main circuit, the activatable additional function circuit, or both the auxiliary circuit when the activatable auxiliary circuit is attached to said main circuit and the activatable additional function circuit in dependence on the address data received via the address bus from the main processor.

7. A method of upgrading a gaming machine to enhance security, said gaming machine having a main circuit including a main processor and a memory, an address bus, an activatable additional function circuit and an activatable auxiliary circuit being removably attachable to said main circuit, wherein the activatable additional function circuit being partitioned separately from the activatable auxiliary circuit and the main circuit, said activatable additional function circuit upon activation being in data communication with the main circuit via the address bus, and an address decoder being partitioned separately from the main circuit, the activatable auxiliary circuit and the activatable additional function circuit, and the address decoder being in data communication with the main circuit, the activatable auxiliary circuit and the activatable additional function circuit via the address bus, the method comprising:
   storing authentication code in said memory of said main circuit of said gaming machine that, when executed by said main processor of the main circuit, causes the main circuit to output challenge data and modify game play if valid response data is not received;
   storing sub-routine code in the memory that when executed outputs sub-routine data; and
   attaching said activatable auxiliary circuit to said main circuit;
   activating said activatable auxiliary circuit, said attaching and activating placing said activatable auxiliary circuit board in data communication with the main circuit of the gaming machine via an address bus;

receiving at said activatable auxiliary circuit challenge data;
processing said challenge data at said activatable auxiliary circuit from the main processor;
outputting the valid response data to the main processor;
producing sub-routine outcome data from said sub-routine data via said activatable additional function circuit;
receiving at the address decoder address data from the main processor via the address bus; and
activating the activatable auxiliary circuit when the activatable auxiliary circuit is attached to said main circuit, the activatable additional function circuit, or both the activatable auxiliary circuit when the activatable auxiliary circuit is attached to said main circuit and the activatable additional function circuit in dependence on the address data received via the address bus from the main processor.

8. A gaming method for use with a gaming machine having a main circuit comprising a main processor for processing sub-routine code that when executed outputs sub-routine data, a removably connectable activatable auxiliary circuit, an address, an activatable additional function circuit and an address decoder, wherein the activatable additional function circuit being partitioned separately from the activatable auxiliary circuit and the main circuit, said activatable additional function circuit upon activation being in data communication with the main circuit via the address bus, and an address decoder being partitioned separately from the main circuit, the activatable auxiliary circuit and the activatable additional function circuit, and the address decoder being in data communication with the main circuit, the activatable auxiliary circuit and the activatable additional function circuit via the address bus, the method comprising:

connecting the activatable auxiliary circuit, via said address bus, to the main circuit to process challenge data;
outputting the valid response data to the main processor;
attaching said activatable auxiliary circuit to said main circuit and activating said activatable auxiliary circuit;
providing the activatable auxiliary circuit with said activatable additional function circuit in data communication with the main circuit via the address bus;
receiving at the address decoder address data from the main processor via the address bus;
producing sub-routine outcome data and an address activating the activatable auxiliary circuit when the activatable auxiliary circuit is attached to said main circuit, the activatable additional function circuit, or both the activatable auxiliary circuit when the activatable auxiliary circuit is attached to said main circuit and the activatable additional function circuit via the address decoder in dependence on the address data received via the address bus from the main processor;
sending the challenge data to the activatable auxiliary circuit;
processing the challenge data via the activatable auxiliary circuit in order to output valid response data to the main processor; and
modifying game play of the game if valid response data is not received by the main processor.

* * * * *